(12) United States Patent
Berrangé

(10) Patent No.: US 11,381,566 B2
(45) Date of Patent: Jul. 5, 2022

(54) ISOLATING NETWORK RESOURCES IN A VIRTUALIZED ENVIRONMENT

(71) Applicant: Red Hat, Inc., Raleigh, NC (US)

(72) Inventor: Daniel Pierres Berrangé, London (GB)

(73) Assignee: Red Hat, Inc., Raleigh, NC (US)

( * ) Notice: Subject to any disclaimer, the term of this patent is extended or adjusted under 35 U.S.C. 154(b) by 1144 days.

(21) Appl. No.: 14/824,617

(22) Filed: Aug. 12, 2015

(65) Prior Publication Data
US 2017/0048249 A1 Feb. 16, 2017

(51) Int. Cl.
G06F 21/62 (2013.01)
H04L 9/40 (2022.01)

(52) U.S. Cl.
CPC ........ H04L 63/102 (2013.01); G06F 21/6281 (2013.01)

(58) Field of Classification Search
CPC ........................... H04L 63/102; G06F 21/6281
USPC .......................................................... 705/50
See application file for complete search history.

(56) References Cited

U.S. PATENT DOCUMENTS

| | | | |
|---|---|---|---|
| 6,622,220 B2 | 9/2003 | Yoshida et al. | |
| 6,931,530 B2 | 8/2005 | Pham et al. | |
| 7,500,069 B2 | 3/2009 | Hochmuth et al. | |
| 7,831,570 B2 | 11/2010 | Sack et al. | |
| 8,352,608 B1 * | 1/2013 | Keagy ................ | G06F 9/45533 709/225 |
| 8,438,654 B1 * | 5/2013 | von Eicken ............. | G06F 21/53 718/1 |
| 8,813,225 B1 | 8/2014 | Fuller et al. | |
| 8,909,781 B2 | 12/2014 | Osmond | |
| 9,027,087 B2 | 5/2015 | Ishaya et al. | |
| 2010/0132011 A1 | 5/2010 | Morris et al. | |
| 2011/0238984 A1 * | 9/2011 | Roush .................... | G06F 21/53 713/166 |
| 2013/0104127 A1 * | 4/2013 | Domsch ................ | G06F 9/5077 718/1 |

(Continued)

OTHER PUBLICATIONS

Ron White, How Computers Work, Oct. 15, 2003, Paul Boger, Illustrated by Timothy Edward Downs, 7th Edition (Year: 2003).*

(Continued)

*Primary Examiner* — Mohammad A. Nilforoush
*Assistant Examiner* — Wodajo Getachew
(74) *Attorney, Agent, or Firm* — Lowenstein Sandler LLP

(57) ABSTRACT

Embodiments of the disclosure provide techniques for isolating network resources in a virtualized environment. A method is provided that includes identifying a security context data structure including a first security context label, a resource identifier and a plurality of access types. The first security context label is associated with a virtual machine. Each of the plurality of access types represents a type of access permitted to a resource associated with the resource identifier. The first security context label is associated with a network resource. A request to validate an access right of a client with respect to the network resource is received. The request comprises a second security context label associated with the client and the first security context label associated with the resource. The request is validated in view the first and second security context labels and the security context data structure.

17 Claims, 7 Drawing Sheets

(56) References Cited

U.S. PATENT DOCUMENTS

2013/0227561 A1* 8/2013 Walsh ................... G06F 9/455
718/1
2014/0331337 A1 11/2014 Factor et al.

OTHER PUBLICATIONS

Daniel P. Berrange, "RFC: sVirt Disk Isolation With Network Based Storage", Aug. 20, 2014.
Laura Novich, et al., "Red Hat Enterprise Linux 6 Virtualization Administration Guide", 2014, Red Hat Customer Content Services.
Anil Kurmus, et al., "A Comparison of Secure Multi-tenancy Architectures for Filesystem Storage Clouds", IBM Research—Zurich, Dept. of Computer Science and Engineering, UCSD.

\* cited by examiner

ISOLATING NETWORK RESOURCES IN A VIRTUALIZED ENVIRONMENT

TECHNICAL FIELD

The present disclosure is generally related to virtualized computer systems, and is more specifically related to systems and methods for isolating network resources in a virtualized environment.

BACKGROUND

A virtual machine (VM) is a software artifact that, when executed on appropriate hardware, creates an environment that allows for a virtualization of various resources of an actual physical computer system (e.g., a server, a mainframe computer, etc.). The actual physical computer system is typically referred to as a "host machine," and the operating system of the host machine is typically referred to as the "host operating system." On the host machine, a virtual machine monitor known as a "hypervisor" manages the execution of one or more virtual machines. The virtual machine monitor provides a variety of functions, such as allocating and executing request by the virtual machines for the various resources of the host machine.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

The present disclosure is illustrated by way of examples, and not by way of limitation, and may be more fully understood with references to the following detailed description when considered in connection with the figures, in which.

DETAILED DESCRIPTION

Figure 1:
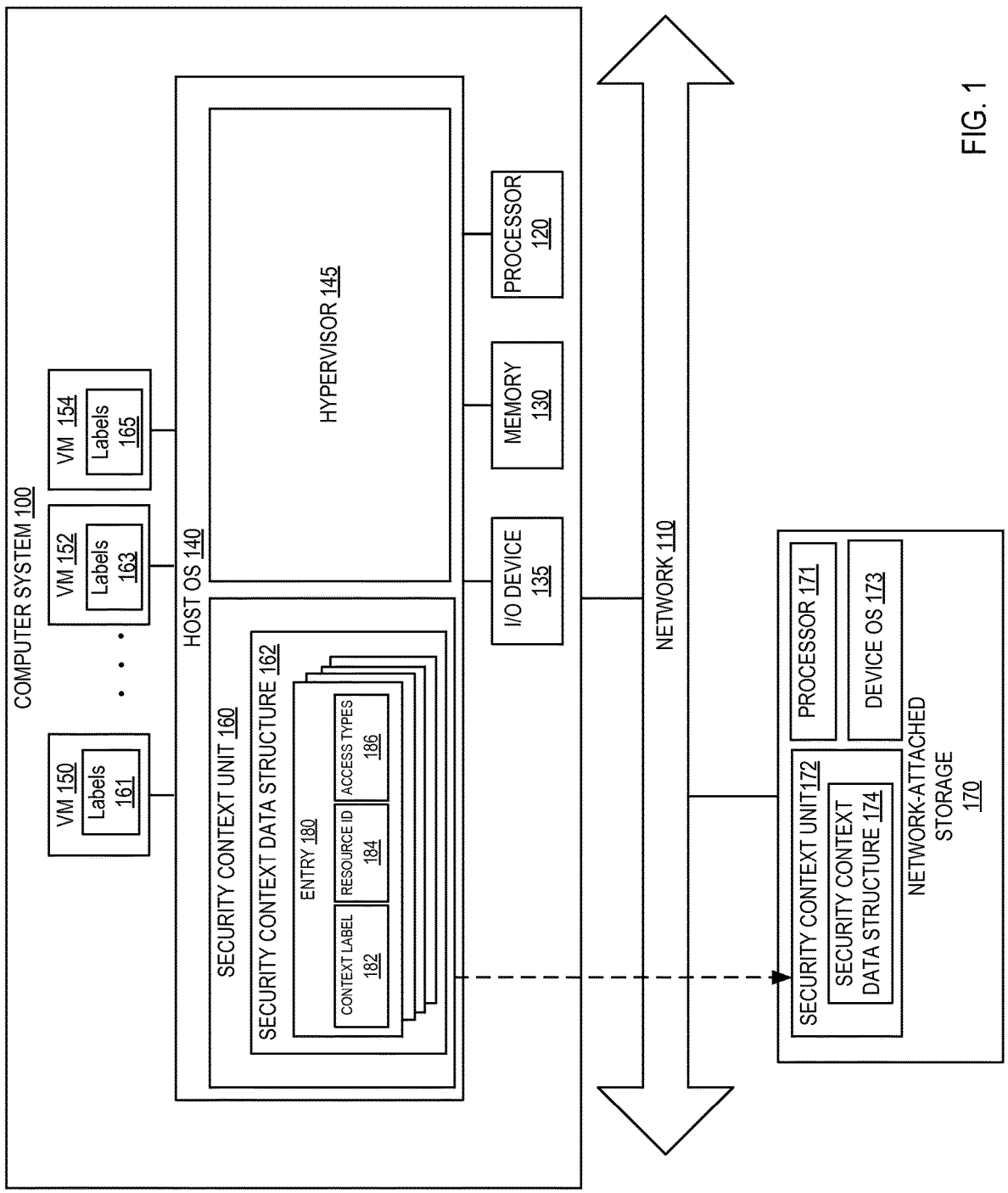
FIG. 1 is a system for isolating network resources in accordance with one or more aspects of the present disclosure.

Described herein are techniques for isolating network resources in a virtualized environment. In the virtualized environment, there is typically a hypervisor component that can run a plurality of "guest" domains (e.g., operating systems and virtual machines) on a physical host platform. The hypervisor may provide a device emulation framework, such as quick emulator (QEMU®), on the physical host machine that allows each guest domain to have a complete virtualized machine platform to run on. The device emulation framework is often run on a host kernel or operating system (OS) that may provide a limited amount of isolation for virtualized guest domains to prevent them from interfering with each other or the host platform. For example, if a device emulator needs to access a host block device (e.g., hard disks, cd-rom drives, etc.), the device emulator's access may need to be restricted to that particular block device only rather than having access to all block devices.

Some systems may implement mandatory access controls (MAC) to provide system controlled policy restricting access to resource objects of the host system, such as data files, devices, etc. In some situations, these systems may implement a kernel security module also referred to as Security-Enhanced Linux (SELinux) that may provide a mechanism for supporting access control security policies, such as MAC, by labeling resources that are assigned to a specific guest domain. In some embodiments, the techniques disclosed herein may use secure virtualization to provide isolation of a device emulator on a virtualized host through labeling of the resource objects using the kernel security module. For example, in the event of a security flaw in a given device emulator, secure virtualization may prevent the compromised emulator from being used to compromise other emulator processes or the host OS. In this way two guests running on the same host may have a security separation that is closer to what can be achieved if they were running on separate physical machines.

In operation, secure virtualization may include confining the guest domains on the host operating system or host kernel. In some embodiments, each guest domain is assigned a security context label to uniquely identify a specific guest domain (e.g., virtual machine). Any resources on the host machine that are allocated to a specific guest are assigned a security context label that is assigned to the guest domain. For example, a disk image exclusively allocated to a guest may be relabeled using the security context label for that guest.

When a guest domain attempts to access a file on the relabeled disk, the host OS may deny access unless there is a policy rule permitting the guest domain access and a match between the security context labels associated with the guest domain and the disk. Since each guest domain has a unique security context label, the guest domains may be restricted from accessing each other's disk images, even if the permissions set by the emulator for a group of guest domains would have otherwise allowed them all to access the disk. As long as the resource assigned to the guest domain can be labeled, then access to that resource can be controlled via secure virtualization. This allows the security context labels to confine resources of the physical host that include not only disk images, for example, the host resources may include serial console logs, UNIX sockets, shared memory files, arbitrary block/character devices, etc.

Increasingly, many systems today use network based resources, such as a network based storage device (e.g., RBD, Gluster, iSCSI). In some situations, when a network based storage device is used, the virtualized host acts as a network client with respect to communicating with the storage device. For example, the hypervisor process may access a remote network client associated with the network based storage device directly to perform I/O against the device. For a variety of reasons, it is becoming more common to push the network client code into the hypervisor itself, which bypasses the kernel and/or host OS services. Principally, this helps the guest domains obtain a shorter I/O path by being able to connect to the network devices without going through the host OS in order to improve system performance.

For the hypervisor to act as the network client, it needs to be given permission to connect directly to the storage server over the network. As a result, the hypervisor has direct access to the networked storage server, thus bypassing any access controls that the host OS can implement on resources of the server once the host OS is authenticated. For example, while the host OS can see the connection between the hypervisor and the networked storage server, it cannot interpret the data being transferred. The host OS is thus unable to determine what network resources are being accessed by the hypervisor and thus cannot isolate them. This may impose a significant risk for certain systems (e.g., cloud-based systems) that may need to use direct connection of the hypervisor to the storage device to obtain better I/O performance from the hypervisor by eliminating data copies through the host OS storage infrastructure.

Embodiments of the present disclosure provide systems and methods to extend secure visualization protections for isolating network resources while still allowing a virtualized host to act as a network client. In one embodiment, a host OS may generate security context labels and transfer the labels to a network server associated with the network resources. The network server is then modified to request access control checks using the security context labels whenever there is a request to access the network resources. In another embodiment, instead of modifying the network server, a proxy server residing, for example, on the host machine may be employed for maintain security context labels associated with the network resources and may be used to interpret access protocols for the network resources in order to apply access control checks for the virtualization host. In yet another embodiment, each virtual machine of the virtualization host may be assigned a unique login account associated with the network resources. Each login account may be configured to only permit access to the network resources associated with the virtual machine using that account. Still further, the techniques disclosed herein may be used in other embodiments for isolating network resources in a virtualized environment.

Although aspects of the present disclosure may be particularly useful with certain type of network devices/services, the techniques disclosed herein may be used with are other types of network services that a virtual machine emulator like the hypervisor may need to access. For example, the hypervisor process may have the ability to receive random entropy (e.g., seed data) from a separate network process, to feed into a guest random number generator. If the random entropy can be passed to the security context of the hypervisor process, it may be possible to restrict the ability of certain guest domains to request entropy.

FIG. 1 depicts a high-level component diagram of an exemplary computer system 100 for isolating network resources that may be used to implement one or more aspects of the present disclosure. As shown, the computer system 100 may be coupled to a network 110 and include a processor 120 communicatively coupled to a memory 130, and an I/O device 135.

"Processor" herein refers to a device capable of executing instructions encoding arithmetic, logical, or I/O operations. In one illustrative example, a processor may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). "Memory" herein refers to a volatile or non-volatile memory device, such as RAM, ROM, EEPROM, or any other device capable of storing data. "I/O device" herein refers to a device capable of providing an interface between a processor and an external device capable of inputting and/or outputting binary data. Although, for simplicity, a single processor 120 is depicted in FIG. 1, in some other embodiments computer system 100 may comprise a plurality of processors. Similarly, in some other embodiments computer system 100 may comprise a plurality of I/O devices, rather than a single device 135.

The computer system 100 may be a server, a mainframe, a workstation, a personal computer (PC), a mobile phone, a palm-sized computing device, etc. The network 110 may be a private network (e.g., a local area network (LAN), a wide area network (WAN), intranet, etc.) or a public network (e.g., the Internet). Computer system 100 may run "host" software or kernel, such host operating system 140, that manages the hardware resources of the computer system and that provides functions such as inter-process communication, scheduling, memory management, and so forth. In one embodiment, the host operating system 140 may also comprises a hypervisor 145, which may be software that provides a virtual operating platform for a set of virtual machines (VMs) 150-154, and manages the execution of these virtual machines.

Hypervisor 145 may take many forms. For example, hypervisor 145 may be part of or incorporated in the host operating system 140 of computer system 100, or hypervisor 145 may be running on top of the host operating system 140. Alternatively, hypervisor 145 may a "bare metal" hypervisor that runs on hardware of computer system 100 without an intervening operating system. The hypervisor 145 manages system resources, including access to processor 120, memory 130, I/O device 135, and so on. The hypervisor 145, though typically implemented in software, may emulate and export a physical layer of computer system 100 to higher level software. Such higher level software may comprise a standard or real-time operating system (OS), may be a highly stripped down operating environment with limited operating system functionality, may not include traditional OS facilities, etc. The hypervisor 145 presents to other software (e.g., VMs 150-154) an abstraction of the physical layer that may provide the same or different abstractions to various guest software, such as guest operating system, guest applications, etc.). Some examples of hypervisors include quick emulator (QEMU®), kernel mode virtual machine (KVM®), virtual machine monitor (VMM), etc.

The hypervisor 145 may support a plurality of VMs 150-154 residing on the computer system 100. In some embodiments, more than one hypervisor (not shown) may be provided to support the VMs 150-154 of the computer system 100. The VMs 150-154 may be a software implementation of a machine that executes programs as though the VMs 150-154 were an actual physical machine. Each virtual machine may execute a guest operating system and other types of software and/or applications. The hypervisor 145 can either handle request by the VMs 150-154 for machine resources, or forward the request to the host OS 140.

In some embodiments, computer system 100 may provide isolation for local processes to prevent them from interfering with each other or the physical layer of the system 100. In one embodiment, system 100 may include a security context unit 160 implemented in the host OS 140. The security context unit 160 may include secure virtualization logic implemented as software, firmware, and hardware or in any combination thereof. In some embodiments, the security context unit 160 may implement certain secure virtualization methods (e.g., confining the guest domains) to isolate local processes, such as VMs 150-154, from accessing with each other's assigned resources. For example, the security context unit 160 may be adapted to generate unique context labels 161-165 for resources associate with a corresponding VM of the VMs 150-154. Each context label of the context labels 161-165 may be used to identify one of the VMs 150-154. In this regard, the host OS 140 may assign a unique security context label generated by the security context unit 160 to each virtual machine when that VM is started. These security context labels are used to isolate the VMs 150-154 from each other.

In some embodiments, the host OS 140 can enforce a security policy the VMs 150-154 based on the context labels 161-165. For example, each context label may be used to label a type of resource to enforce rules for permitting access to that resource by the VMs 150-154. In some embodiments, the host OS 140 may re-label a reference name (e.g., an Internet protocol (IP) address) of a resource to include one of the context labels 161-165 for a particular VM of the VMs 150-154 to indicate that the resource is assigned to that VM. Once the resource is labeled by the host OS 140, the host OS 140 can apply a set of administrative context policy rules for authorizing or rejecting access by the VMs 150-154 to the labeled resources.

To enforce the administrative context policy rules, the host OS 140 may include a security context data structure 162 (e.g., an array, tree, list or other types of data structures, etc.) that may include a plurality of entries, such as entry 180. Each entry may include, but not limited to, a context label 182 that may be associated with one of the labels 161-165 assigned to the VMs 150-154, a recourse identifier 184 and a set of access types 186. Each of the access types 186 may represent a type of access permitted to a resource associated with the resource identifier 184. Theses access types 186 may include an access right to read or write or change a security context label associated with the resource.

In one illustrative example, the host OS 140 may check the security context data structure 162 when a VM attempts to access a resource of system 100. In such cases, the host OS 140 may use the security context data structure 162 may identify certain access rights that the VM has for a specified resource. The host OS 140 validates the VM's right to access a resource by determining whether the security context label associated a VM and the security context label associated with the resource corresponds to an entry in the security context structure 162. For example, the host OS 140 may determine whether the security context label identifies the VM. The host OS 140 may also determine whether at least one of the access types associated with the entry in the security context data structure 162 corresponds with the access right of the VM. For example, if the VM only has rights read a resource, then any attempt for the VM to write to the recourse should be rejected by the host OS 140. If the host OS 140 validates the access rights of the VM, then a response may be generated by the host OS 140 authorizing the request of the VM. Otherwise, the host OS 140 may generate a rejection response to the request of the VM to access the resource.

In some situations, the VMs 150-154 may also need to access certain network based resources, for example, for certain cloud-based applications. In one embodiment, the VMs 150-154 may be in communication via network 110 with a network-attached storage device 170. In some embodiments, the network-attached storage device 170 may include one or more processors 173 that execute a device OS or kernel operating system that runs locally on the device 170. In some situations, when the network-attached storage device 170 is used, the hypervisor 145 may directly perform I/O against the device 170. In such situations, the host OS 140 may not be able to intercept access request made by the VMs 150-154 to the network-attached storage device 170 because the hypervisor 145 is directly connecting to it, thus the security context unit 160 may not be able to label network based resources (e.g., file paths or volumes) associated with the device 170 to isolate the resources from amongst the different VMs 150-154.

In some embodiments, to isolate network based resources (e.g., file paths, volumes, etc.) associated with the device 170, the security context unit 160 may communicate with the storage device 170 using administrative login credentials via a secure communication protocol, such as internet protocol security (IPsec). In some embodiments, the context labels 161-165 may be transmitted across and used by a second security context unit 162 installed on the storage device 170. For example, the storage device 170 may be modified to run the second security context unit 162 on a local host OS of the device. In some embodiments, the second security context unit 162 may run in the device OS 173 that is executed by the processor 171. Thereafter, the context labels 161-165 may be used to label resources associated with the storage device 170.

In one embodiment, the host OS 140 may communicate with device 170 to identify which labels should be assigned to certain resources of the storage device 170. For example, the host OS 140 may set context labels to resources on the storage device 170 using a determined system call associated with the device 170. Using the system call, the host OS 140 may instruct the second security context unit 172 on the storage device 170 to associate a given context label with a particular resource that the device 170 hosts in a second security context data structure 174 local to the storage device 170. For example, the second security context data structure 174 may be similarly configured to include a plurality of entries, such as entry 180 where each entry includes a context label, such as context label 182, reference identifier, such as resource ID 184 and a plurality of access types, such as access types 186. The storage device 170 may be instructed to append the context label to a reference identifier or name of the resources at the storage device 170. In some embodiments, this may be done before starting any virtual machines and immediately prior to hot-plugging a resource associated with the storage device 170. When hot-unplugging the resource or shutting down a virtual machine, the security context labels are reset to deny any further access using those labels.

The storage device 170 may then perform an access control check for any access attempt to its labeled resource using the second security context unit 172 to validate the security context labels associated with a connecting network client. In one embodiment, when a network client (e.g., one of the VMs 150-154) attempts to accesses resources of storage device 170 (e.g., read, write, etc.), the device 170 will request that the network client provide its security context label. In other embodiments, the network client may provide its security context label with the request. For example, the network client may use a secure network protocol, such as Internet protocol security (IPsec), to transmit over network 110 a security context label associated with the client to the storage device 170. In an alternative embodiment, the storage device 170 may retrieve a security context label associated with a connecting network client directly from the client by using, for example, a determined interface of the client.

The storage device 170 may then request that the device OS 173 perform the access control check by using the security context unit 172 to apply context policy rules associated with the resource. To apply the context policy rules, the device OS 173 may use the security context data structure 174 of security context unit 172 to identify an entry associated with the security context label of the network client to validate that the client has access to those resources according to the access types in that entry. In this regard, the storage device 170 is not actually interpreting the context policy rules of the host OS 140, rather it is passing security context labels associated with the resource and the client to the device OS 173 which may in turn transmit an authorization or rejection response. The storage device 170 is thus applying mandatory access control checks that are equivalent to those performed when the host OS 140 is accessing local resources, for example, via local files or block devices.

In some embodiments, the storage device 170 can also request a check of whether a connecting client has access to assign and/or reassign security context labels of resources associated with the device 170. For example, the security context 172 may itself have a security context label that may be made available to the storage device 170 that can be validated by device OS 173. The storage device 170 can thus verify whether that client is actually permitted to change the security context labels of resources associated with the storage device 170. An advantage of this type of access control check is that it may add an additional level of protection by helping to prevent unauthorized clients from changing security context labels for the resources of the storage device 170.

Figure 2:
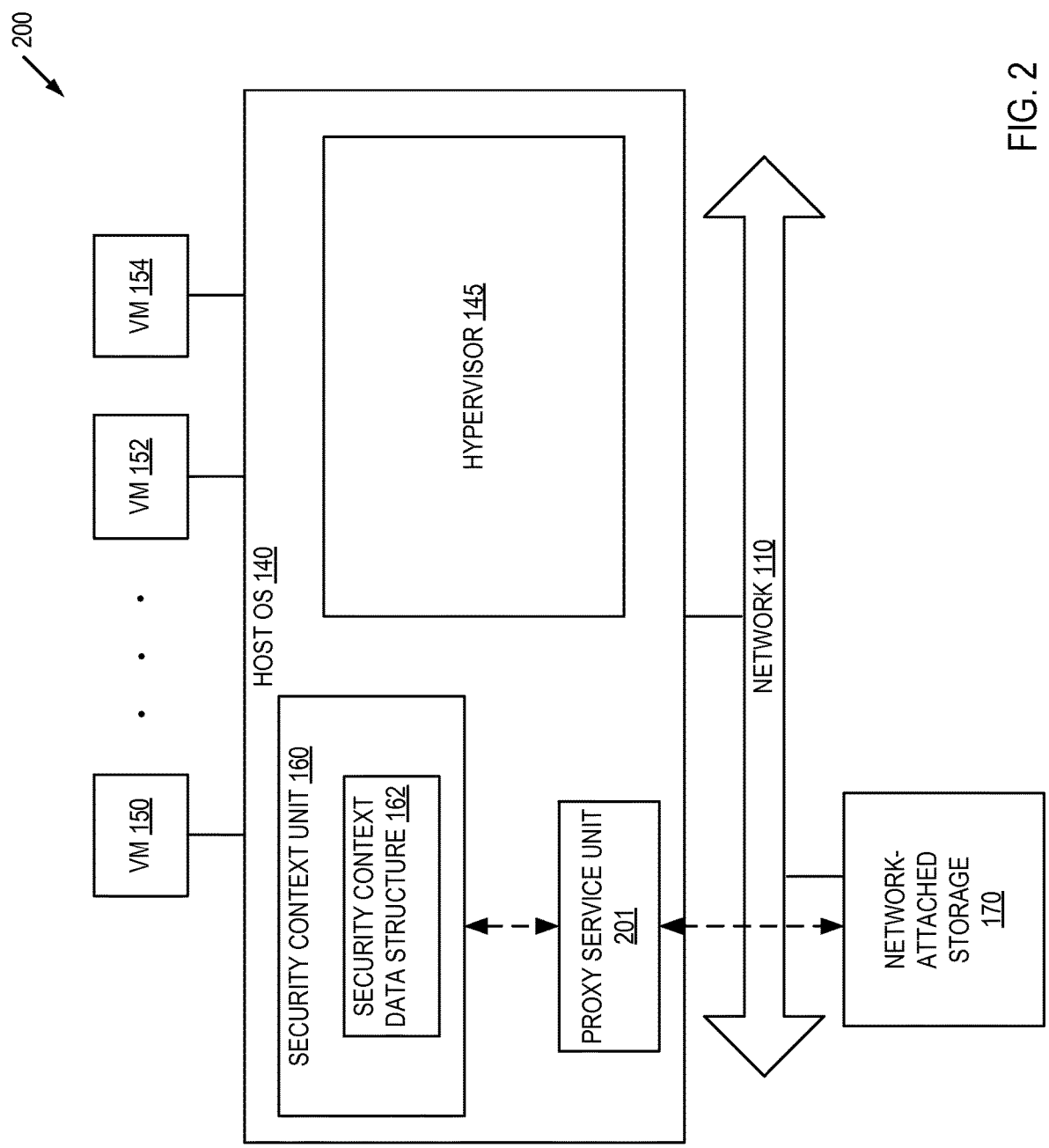
FIG. 2 is another system for isolating network resources in accordance with one or more aspects of the present disclosure.

In FIG. 2, another system 200 for isolating network resources in accordance with one or more aspects of the present disclosure is shown. Similar to system 100 of FIG. 1, system 200 may be include host OS 140 and hypervisor 145 for managing VMs 150-154 as well as other similar components coupled to network 110. As shown, the host OS 140 may also include security context unit 160 for isolating system resources from each of the different VMs 150-154 and a security context data structure 162 for storing a set of administrative context policy rules for authorizing or rejecting access to resources that are labeled by the host OS 140 using the security context unit 160. As noted above, in some embodiments, the security context unit 160 may communicate with a modified network-attached storage device 170 in order to isolate network-based resources associated with the device 170.

In this example, instead of modifying the network-attached storage device 170, a proxy service unit 201 may be created. In some embodiments, the proxy service unit 201 may run directly run on the host OS 140. In other embodiments, the proxy service unit 201 may run off of the host OS 140 and be in communication with system 100. The security context unit 160 may be adapted to connect to this local proxy service unit 201 instead of the storage device 170. The local proxy service unit 201 may be configured to maintain the security context labels associated with the storage device 170. In some embodiments, the proxy service unit 201 may communicate with the storage device 170 in order to apply access control checks for accesses request to labeled resources of the device 170. In one embodiment, the security context unit 160 may communicate with the proxy service unit 201 to associated security context labels with resources of the storage device 170.

In some embodiments, when a client (e.g., one of the VMs 150-154) connects with the storage device 170, the proxy service unit 201 can communicate with the storage protocol to identify which resources the client was attempting to access. In this regard, since the security context unit 160 is running on the same host, the proxy service unit 201 can obtain the security context label of the client without having to use a secure communication protocol, such as IPsec. The proxy service unit 201 can then request for the host OS 140 to perform an access control check on the security context label of the client and the resources to determine whether to authorize or reject the access request. If the request is allowed, then the proxy service unit 201 may perform un-modified data transmissions in both directions between the host OS 140 and the storage device 170. An advantage of using a local proxy server, such as proxy service unit 201, is that the storage device does not need to be modified to have knowledge of the security context labels associated with its resources and that there is no need to maintain a secure communication between the virtualization host and the storage device 170.

Figure 3:
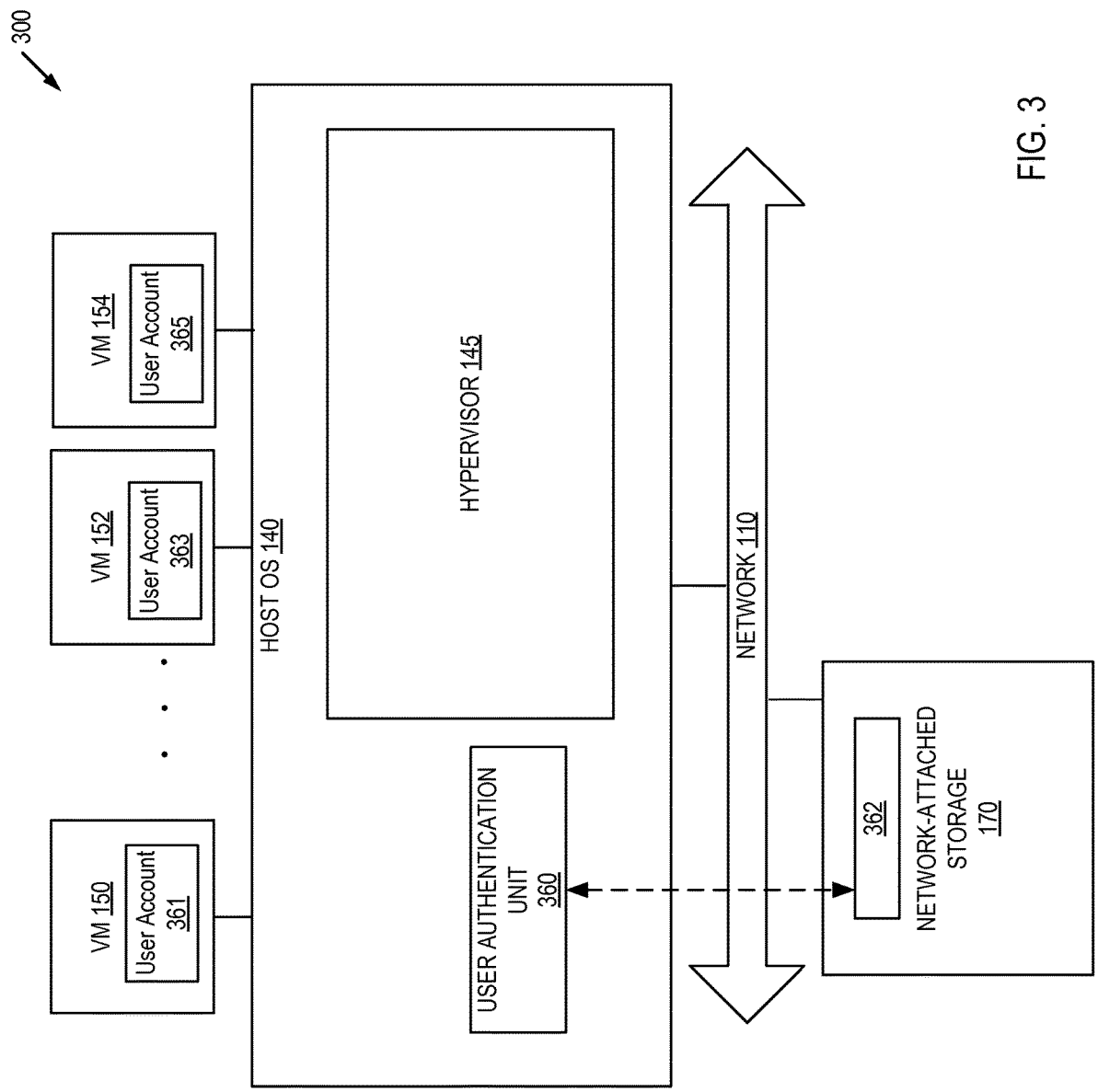
FIG. 3 is yet another system for isolating network resources in accordance with one or more aspects of the present disclosure.

In FIG. 3, yet another system 300 for isolating network resources in accordance with one or more aspects of the present disclosure is shown. Similar to system 100 of FIG. 1 and system 200 of FIG. 2, system 300 may include host OS 140 and hypervisor 145 for managing VMs 150-154 as well as other similar components coupled to network 110. In this example, isolation of network based resources associated with network-attached storage device 170 may be achieved by dynamically creating separate unique user accounts 361-365 and setting up access control checks for each of the VMs 150-154 as they are booted, as opposed to the traditional approach where a system administrator would have to manually pre-create accounts an associated with them virtual machines explicitly.

In some embodiments, system 300 may include a user authentication unit 360 to communicate directly with the storage device 170. In one embodiment, the user authentication unit 360 may create a unique user account (e.g., user name and password) for each virtual machine and pass the user account information to the storage device 170. In some embodiment, the unique user account may be generated based on a universally unique identifier (UUID) associated with a corresponding VM and/or with a random number prefix or other type of techniques for generating a unique user account. In an alternative embodiment, the user authentication unit 360 may instruct the storage device 170 to dynamically create user accounts, such as user accounts 361-365, for each virtual machine when required and generate a unique password for that account. In some embodiments, the user authentication unit 360 may instruct the storage device 170 to setup an access control mapping that permits a given user account to access the specific network-based resources of the storage device 170 that are to be assigned to the virtual machine using that user account.

In some embodiments, permissions for the network-based resources may be set such that the user account associated with the virtual machine only has the ability to access the network-based resources that are to be assigned to it. For example, when launching a VM, the user authentication unit 201 may pass the VM connection details for the network-attached storage device 170 which include the unique user account & password it is allowed to use. Thus, while hypervisor 145 may have a direct connection to the storage device 170, in the event of a compromise, the VM will still be restricted in what storage devices it would be able to access. This is an improvement over the case where all VMs 361-365 share the same login credentials and thus same access rights over the storage device 170.

One advantage achieved by using user authentication based access control checks is a separation between the identity that a user or application is authenticated with (UNIX login name/group), and the identity under which access control decisions are made at a VM level (e.g., labeling using security context labels). This may permit finer grained controls over access policy and allows for rules to be written by determining when the authorization identity is changed. An additional advantage of using user authentication based access control checks is that the storage device does not need to the modified to have knowledge of the security context labels associated with its resources.

To better aid in understanding an example of some of the aspects of the present disclosure described above, for example, that are related to isolating network resources in a virtualized environment, reference is now made to the following example flow diagrams. Although the operations of the flow diagrams herein are shown and described in a particular order, the order of the operations of each flow diagram may be altered so that certain operations may be performed in an inverse order or so that certain operation may be performed, at least in part, concurrently with other operations. In certain implementations, instructions or sub-operations of distinct operations may be in an intermittent and/or alternating manner.

Figure 4:
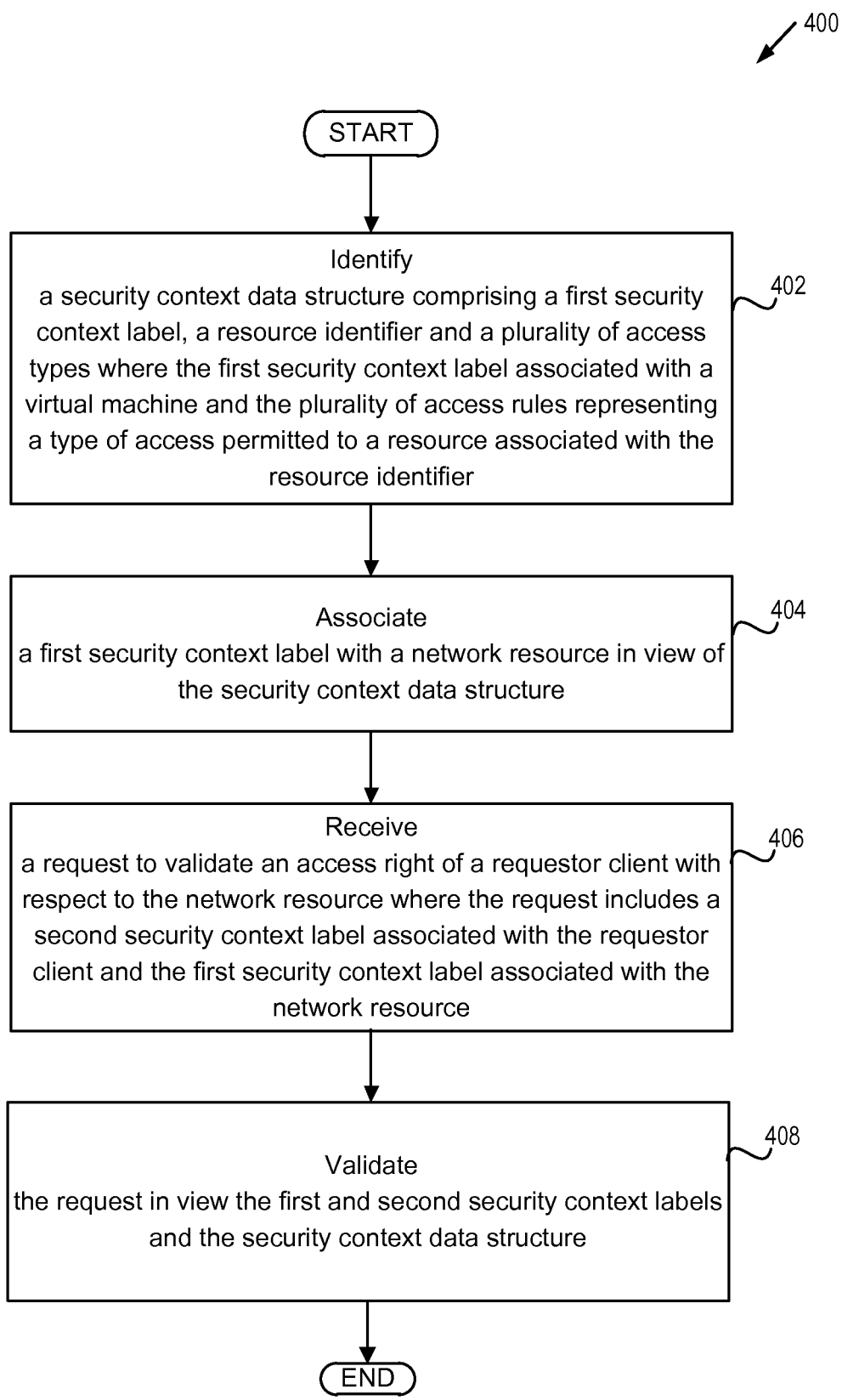
FIG. 4 depicts a flow diagram of a method for isolating network resources in accordance with one or more aspects of the present disclosure.

FIG. 4 depicts a flow diagram of one embodiment of a method 400 for isolating network resources in accordance with one or more aspects of the present disclosure. In one embodiment, host OS 140 or the device OS 173 of network-attached storage device 170 of FIG. 1 may perform method 400 to isolate network resources in a virtualized environment. The method 400 may be performed by processing logic that may comprise hardware (circuitry, dedicated logic, etc.), software (such as is run on a general purpose computer system or a dedicated machine), or a combination of both. Alternatively, in some other embodiments, some or all of the method 400 might be performed by other components of computer system. As noted above, the blocks depicted in FIG. 4 can be performed simultaneously or in a different order than that depicted.

Method 400 begins at block 402 where a processing device of a host computer system generates a security context data structure comprising a first security context label, a resource identifier and a plurality of access rules. The first security context label associated with a virtual machine and each of the plurality of access rules representing a type of access permitted to a resource associated with the resource identifier. At block 404, the processing device associates a first security context label with a network resource in view of the security context data structure. A request to validate an access right of a requestor client with respect to the network resource is received at block 406. The request includes at least a second security context label associated with a requestor client device and the first security context label associated with the network resource. At block 408, the processing device validates (e.g., authorizes or rejects) the request in view the first and second security context labels and the security context data structure.

Figure 5:
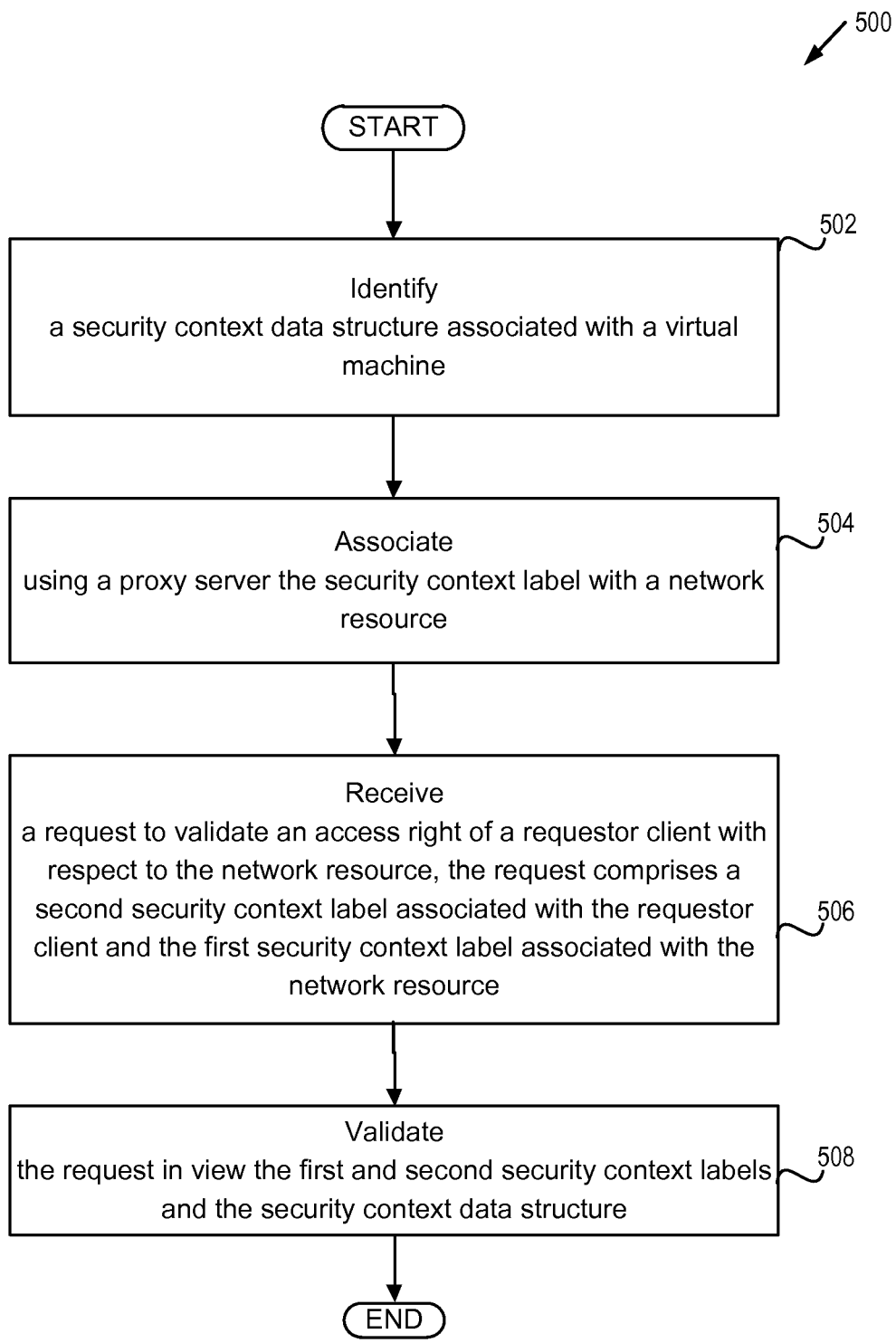
FIG. 5 depicts a flow diagram of another method for isolating network resources in accordance with one or more aspects of the present disclosure.

FIG. 5 depicts a flow diagram of one embodiment of a method 500 for isolating network resources in accordance with one or more aspects of the present disclosure. In one embodiment, the host OS 140 of FIG. 2 may perform method 500 to isolate network resources in a virtualized environment. The method 500 may be performed by processing logic that may comprise hardware (circuitry, dedicated logic, etc.), software (such as is run on a general purpose computer system or a dedicated machine), or a combination of both. Alternatively, in some other embodiments, some or all of the method 500 might be performed by other components of computer system. As noted above, the blocks depicted in FIG. 5 can be performed simultaneously or in a different order than that depicted.

Method 500 begins at block 502 where a processing device of a host computer system generates a security context data structure associated with a virtual machine. At block 504, using a proxy server the security context label may be associated with a network resource. A request to validate an access right of a requestor client with respect to the network resource is received at block 506. The request includes at least a second security context label associated with a requestor client device and the first security context label associated with the network resource. At block 508, the processing device validates (e.g., authorizes or rejects) the request in view the first and second security context labels and the security context data structure.

Figure 6:
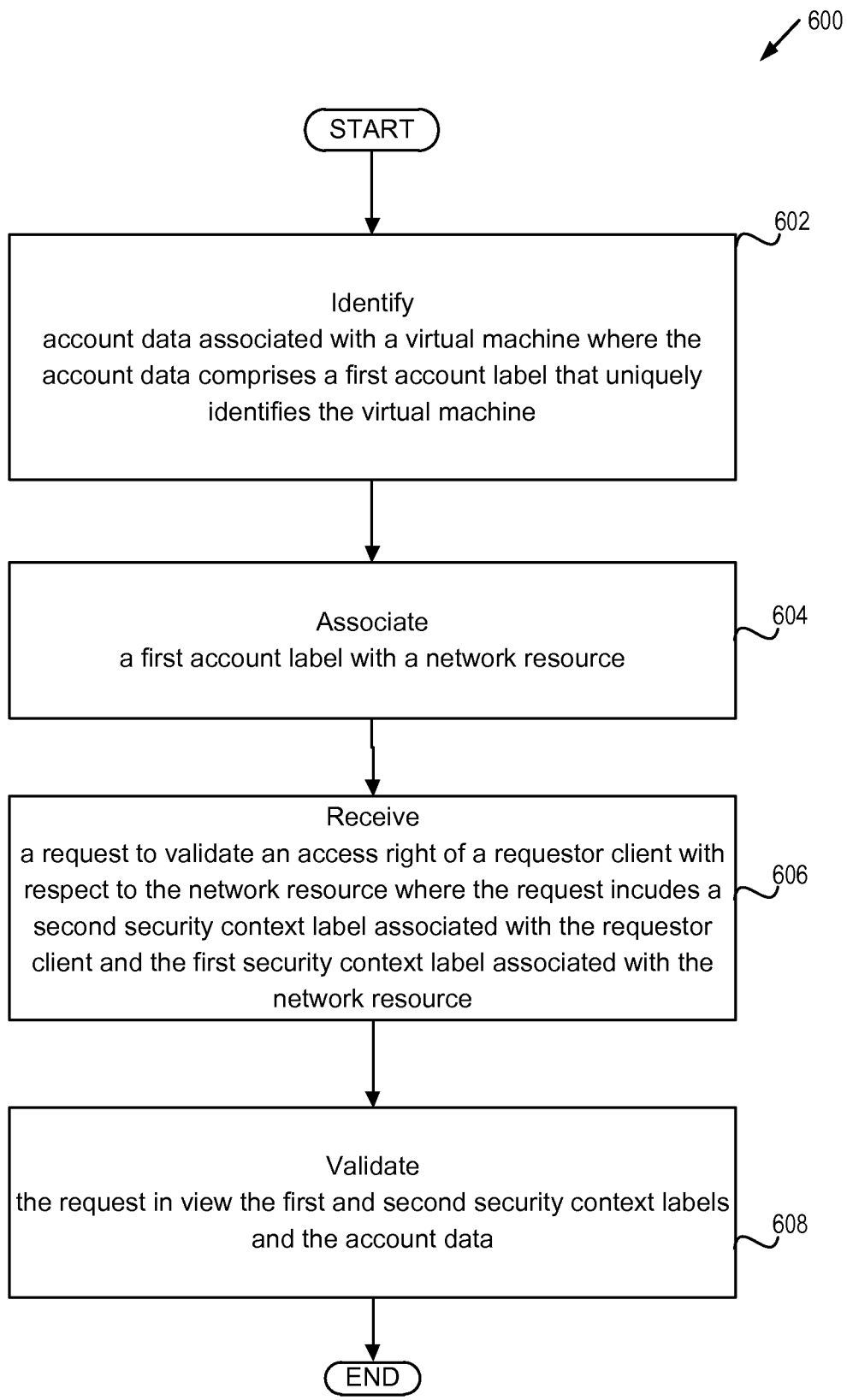
FIG. 6 depicts a flow diagram of yet another method for isolating network resources in accordance with one or more aspects of the present disclosure.

FIG. 6 depicts a flow diagram of one embodiment of a method 600 for isolating network resources in accordance with one or more aspects of the present disclosure. In one embodiment, the host OS 140 of FIG. 3 may perform method 600 to isolate network resources in a virtualized environment. The method 600 may be performed by processing logic that may comprise hardware (circuitry, dedicated logic, etc.), software (such as is run on a general purpose computer system or a dedicated machine), or a combination of both. Alternatively, in some other embodiments, some or all of the method 600 might be performed by other components of computer system. As noted above, the blocks depicted in FIG. 6 can be performed simultaneously or in a different order than that depicted.

Method 600 begins at block 602 where by a processing device of a host computer system identifies account data associated with a virtual machine. The account data includes an account credential that uniquely identifies the virtual machine. At block 604, the processing device associates a first account label with a network resource in view of the account data. A request to validate an access right of a requestor client with respect to the network resource is received at block 606. The request includes at least a second security context label associated with a requestor client device and the first security context label associated with the network resource. At block 608, the processing device validates (e.g., authorizes or rejects) the request in view the first and second security context labels and the account data.

Figure 7:
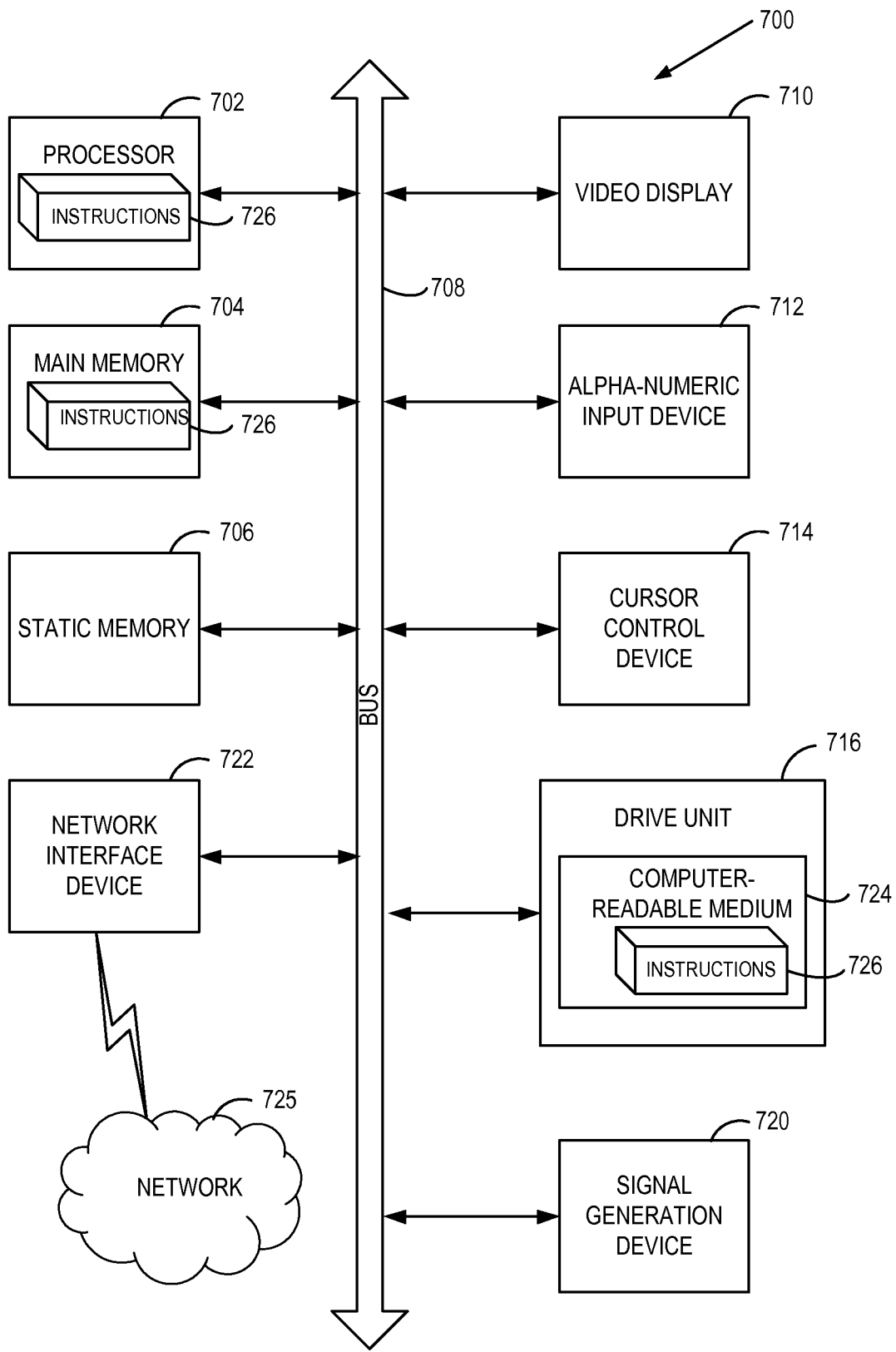
FIG. 7 depicts a block diagram of an example computer system operating in accordance with one or more aspects of the present disclosure.

FIG. 7 depicts an example computer system 700 which can perform any one or more of the methods described herein for isolating network resources in a virtualized environment. In one example, computer system 700 may correspond to computer system 100 of FIG. 1. The computer system may be connected (e.g., networked) to other computer systems in a LAN, an intranet, an extranet, or the Internet. The computer system 700 may operate in the capacity of a server in a client-server network environment. The computer system 700 may be a personal computer (PC), a set-top box (STB), a server, a network router, switch or bridge, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 700 includes a processing system (processor) 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)), and a drive unit 716, which communicate with each other via a bus 708.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 is configured to execute instructions that may include instructions to execute instructions 726 for performing the operations and steps discussed herein. For example, in one embodiment, the instructions 726 may perform any one of the methods of flow diagram 400 of FIG. 4, flow diagram 500 of FIG. 5 and flow diagram 600 of FIG. 6.

The computer system 700 may further include a network interface device 722. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker).

The drive unit 716 or secondary memory may include a computer-readable medium 724 on which is stored one or more sets of instructions 726 (e.g., instructions for the instructions) embodying any one or more of the methodologies or functions described herein. Instructions for the instructions 726 may also reside, completely or at least partially, within the main memory 704 and/or within the processor 702 during execution thereof by the computer system 700, the main memory 704 and the processor 702 also constituting computer-readable media. Instructions 726 may further be transmitted or received over a network via the network interface device 722. The instructions 726 may further be transmitted or received over a network 725 via the network interface device 722.

The non-transitory computer-readable storage medium 724 may also be used to store the instructions 726 persistently. While the computer-readable storage medium 724 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, non-transitory computer-readable storage mediums, solid-state memories, optical media, and magnetic media.

The instructions 726, components and other features described herein can be implemented as discrete hardware components or integrated in the functionality of hardware components such as ASICS, FPGAs, DSPs or similar devices. In addition, the instructions 726 can be implemented as firmware or functional circuitry within hardware devices. Further, the instructions 726 can be implemented in a combination hardware devices and software components. For example, the functionality of this module can exist in a fewer or greater number of modules than what is shown, with such modules residing at one or more computing devices that may be geographically dispersed. The modules may be operable in conjunction with network 725 from which it may receive and provide relevant information regarding isolating network resources in a virtualized environment.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "determining", "allocating", "notifying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method comprising:
   identifying, by a hypervisor executed by a processing device, access rights of a virtual machine to a network resource based on an entry in a security context data structure, wherein the entry comprises a first security context label, a resource identifier of the network resource, and a plurality of access types, wherein the plurality of access types represent types of access to the network resource;
   validating, by the hypervisor executed by the processing device, access to the network resource by the virtual machine in view of the first security context label associated with the network resource and a second security context label associated with the virtual machine, wherein the first security context label and the second security context label corresponds to the entry in the security context data structure;
   accessing, by the hypervisor executed by the processing device, using I/O operations and the resource identifier of the network resource to access the network resource residing on a networked storage server, wherein the I/O operations bypasses access controls implemented by a host OS on the network resource of the network storage server once the host OS is authenticated; and
   authorizing, by the hypervisor executed by the processing device, access to the network resource by the virtual machine in view of at least one of the plurality of access types associated with the entry in the security context data structure.

2. The method of claim 1, wherein the validating comprises determining whether the first security context label and the second security context label correspond with an entry in the security context data structure.

3. The method of claim 2, wherein the validating comprises determining whether at least one of the plurality of access types associated with the entry in the security context data structure corresponds with the access right of a requestor client.

4. The method of claim 1, further comprising:
   associating, by the hypervisor executed by the processing device, the first security context label with a network resource comprising at least one file, wherein the associating comprises associating the first security context label with a label used to reference the network resource.

5. The method of claim 1, further comprising receiving a request to validate an access right to assign a new security context label with respect to the network resource, wherein the request is related to an additional requestor client of an additional virtual machine and comprising an additional security context label associated with the additional requestor client.

6. The method of claim 5, further comprising determining whether to authorize or reject the request in view of the additional security context label and the security context data structure.

7. A system comprising:
   a memory device storing security context data and instructions; and
   a processor operatively coupled to the memory device, the processor executing the instructions to perform operations to:
   identify, by a hypervisor executed by a processor, access rights of a virtual machine to a network resource based on an entry in a security context data structure, wherein the entry comprises a first security context label and a plurality of access types, wherein the plurality of access types represent types of resource access for a virtual machine;
   validate, by the processor executing the hypervisor, access to the network resource by the virtual machine in view of the first security context label associated with the network resource and a second security context label associated with the virtual machine, wherein the first security context label and the second security context label corresponds to the entry in the security context data structure;

access, by the processor executing the hypervisor, using I/O operations and a resource identifier of the network resource to access the network resource residing on a networked storage server, wherein the I/O operations bypasses access controls implemented by a host OS on the network resource of the network storage server once the host OS is authenticated; and authorize access to the network resource by the virtual machine in view of at least one of the plurality of access type associated with the entry in the security context data structure.

8. The system of claim 7, wherein to validate the request the processor is further to determine whether the first security context label and the second security context label correspond with an entry in the security context data structure.

9. The system of claim 7, wherein to validate the request the processor is further to determine whether at least one of the plurality of access types associated with the entry in the security context data structure corresponds with the access right of a requestor client.

10. The system of claim 7, wherein the processor further performs operations to associate the first security context label with a network resource comprising at least one file, wherein associating the first security context label with the network resource, the processing device is to associate the first security context label with a label that references the network resource.

11. The system of claim 7, wherein the processor is further to receive a request to validate an access right to assign a new security context label with respect to the network resource, the request being related to an additional requestor client and comprising an additional security context label associated with the additional requestor client.

12. The system of claim 11, wherein the processor is further to determine whether to authorize or reject the request in view of the additional security context label and the security context data structure.

13. A non-transitory computer readable medium comprising executable instructions that when executed cause a processing device to perform operations comprising:

identifying, using the processing device, access rights of a virtual machine to a network resource based on an entry in a security context data structure, wherein the entry comprises a first security context label, a resource identifier of the network resource, and a plurality of access types, wherein the plurality of access types represent types of resource access for the virtual machine;

validating, by the processing device executing a hypervisor, access to the network resource by the virtual machine in view of the first security context label associated with the network resource and a second security context label associated with the virtual machine, wherein the first security context label and the second security context label corresponds to the entry in the security context data structure;

accessing, by the hypervisor, using I/O operations and the resource identifier of the network resource to access the network resource residing on a networked storage server, wherein the I/O operations bypasses access controls implemented by a host OS on the network resource of the network storage server once the host OS is authenticated; and authorizing access to the network resource by the virtual machine in view of at least one of the plurality of access types associated with the entry in the security context data structure.

14. The non-transitory computer readable medium of claim 13, wherein to validate access to the network resource by the virtual machine the executable instructions further cause the processing device to determine whether the first security context label and the second security context label correspond with an entry in the security context data structure.

15. The non-transitory computer readable medium of claim 14, wherein to validate access to the network resource by the virtual machine the executable instructions further cause the processing device to determine whether at least one of the plurality of access types associated with the entry in the security context data structure corresponds with the access right of a requestor client.

16. The non-transitory computer readable medium of claim 13, wherein responsive to successfully validating access to the network resource by the virtual machine, the executable instructions further cause the processing device to transmit a response authorizing the access right of a requestor client with respect to the network resource.

17. The non-transitory computer readable medium of claim 13, wherein the processing device is further to receive a request to validate an access right to assign a new security context label with respect to the network resource, wherein the request being related to an additional requestor client and comprising an additional third security context label associated with the additional requestor client.

* * * * *

UNITED STATES PATENT AND TRADEMARK OFFICE
CERTIFICATE OF CORRECTION

PATENT NO. : 11,381,566 B2  
APPLICATION NO. : 14/824617  
DATED : July 5, 2022  
INVENTOR(S) : Daniel Pierres Berrangé

Page 1 of 2

It is certified that error appears in the above-identified patent and that said Letters Patent is hereby corrected as shown below:

In the Claims

In Claim 1, Column 14, Line 10, change "corresponds" to "correspond"

In Claim 1, Column 14, Line 14, change "resource to access the network" to "resource, the network"

In Claim 1, Column 14, Line 16, change "operations bypasses access" to "operations bypass access"

In Claim 1, Column 14, Line 17, change "host OS" to "host operating system (OS)"

In Claim 4, Column 14, Line 35-36, change "with a network resource" to "with the network resource"

In Claim 7, Column 15, Line 3, change "corresponds" to "correspond"

In Claim 7, Column 15, Line 7, change "resource to access the network" to "resource, the network"

In Claim 7, Column 15, Line 9, change "operations bypasses access" to "operations bypass access"

In Claim 7, Column 15, Line 10, change "host OS" to "host operating system (OS)"

In Claim 10, Column 15, Line 29-31, change "with a network resource" to "with the network resource"

In Claim 13, Column 16, Line 11, change "corresponds" to "correspond"

In Claim 13, Column 16, Line 14-15, change "resource to access the network" to "resource, the network"

Signed and Sealed this  
Twenty-seventh Day of February, 2024

Katherine Kelly Vidal  
*Director of the United States Patent and Trademark Office*

CERTIFICATE OF CORRECTION (continued)
U.S. Pat. No. 11,381,566 B2

In Claim 13, Column 16, Line 16, change "operations bypasses access" to "operations bypass access"

In Claim 13, Column 17, Line 17, change "host OS" to "host operating system (OS)"